(12) United States Patent
Chapin

(10) Patent No.: US 8,469,419 B2
(45) Date of Patent: Jun. 25, 2013

(54) PIZZA PEEL

(76) Inventor: John Archer Chapin, Bethesda, MD (US)

(*) Notice: Subject to any disclaimer, the term of this patent is extended or adjusted under 35 U.S.C. 154(b) by 110 days.

(21) Appl. No.: 13/213,842

(22) Filed: Aug. 19, 2011

(65) Prior Publication Data
US 2013/0043695 A1  Feb. 21, 2013

(51) Int. Cl.
*A47J 43/28* (2006.01)

(52) U.S. Cl.
USPC .................................. 294/7; 294/9

(58) Field of Classification Search
USPC ............... 294/7, 8, 9, 32, 49, 56, 59
See application file for complete search history.

(56) References Cited

U.S. PATENT DOCUMENTS

| | | | |
|---|---|---|---|
| 843,333 A | 2/1907 | Fickett et al. | |
| 1,216,703 A | 2/1917 | Kraushaar et al. | |
| 2,003,541 A | 6/1935 | Jawort et al. | |
| 2,193,341 A * | 3/1940 | Mehringer | 294/7 |
| 2,462,672 A * | 2/1949 | Portner | 294/8 |
| 2,697,627 A * | 12/1954 | La Fond | 294/32 |
| 3,492,039 A * | 1/1970 | Chmela | 294/7 |
| 4,494,786 A | 1/1985 | Paulus et al. | |
| 4,753,472 A | 6/1988 | Fout | |
| 5,417,463 A | 5/1995 | DiPaola | |
| D394,192 S | 5/1998 | Deglon | |
| 6,746,062 B2 * | 6/2004 | Bielecki et al. | 294/7 |
| 7,607,706 B2 | 10/2009 | Cunningham et al. | |
| 2008/0178747 A1 | 7/2008 | Baker et al. | |

* cited by examiner

*Primary Examiner* — Dean Kramer
(74) *Attorney, Agent, or Firm* — Millen, White, Zelano & Branigan, P.C.

(57) ABSTRACT

A device for retrieving objects from a grill or an oven. The device uses selectively retractable claws lift the object from the grill grate or oven rack and remove it. The claws retract when they come in contact with a cross beam and re-extend in the intervals between. They are arranged to ensure that enough craws are extended at any given time to support the object being removed.

17 Claims, 3 Drawing Sheets

PIZZA PEEL

FIELD OF THE INVENTION

The invention relates to the cooking industry.

BACKGROUND OF THE INVENTION

Previous designs, for example U.S. Pat. Nos. 7,607,706 and 2,003,541, require the retrieving device to be maneuvered between the pizza to be retrieved and the rack or grill it is resting on. Such maneuvering requires skill and often results in damage or destruction to the pizza being retrieved. Therefore, there is a need for the Invention device described herein that more easily retrieves pizzas without damaging them, particularly from ovens and grills.

SUMMARY OF THE INVENTION

The invention is a device that allows objects, for example, pizzas to be removed from racks or grills without maneuvering between the object to be retrieved and the rack or grill on which it rests.

In the embodiments of the invention the device is made up of three parts: a pan portion, a handle portion that is connected to the pan portion, and at least two retractable claws extending from the pan portion. Each claw is comprised of a top portion and at least one body portion. Each claw independently extends above the pan portion surface to support an object on the top portion and retracts when physical force is applied to a side of the body portion.

DETAILED DESCRIPTION OF THE DRAWINGS

Figure 1:
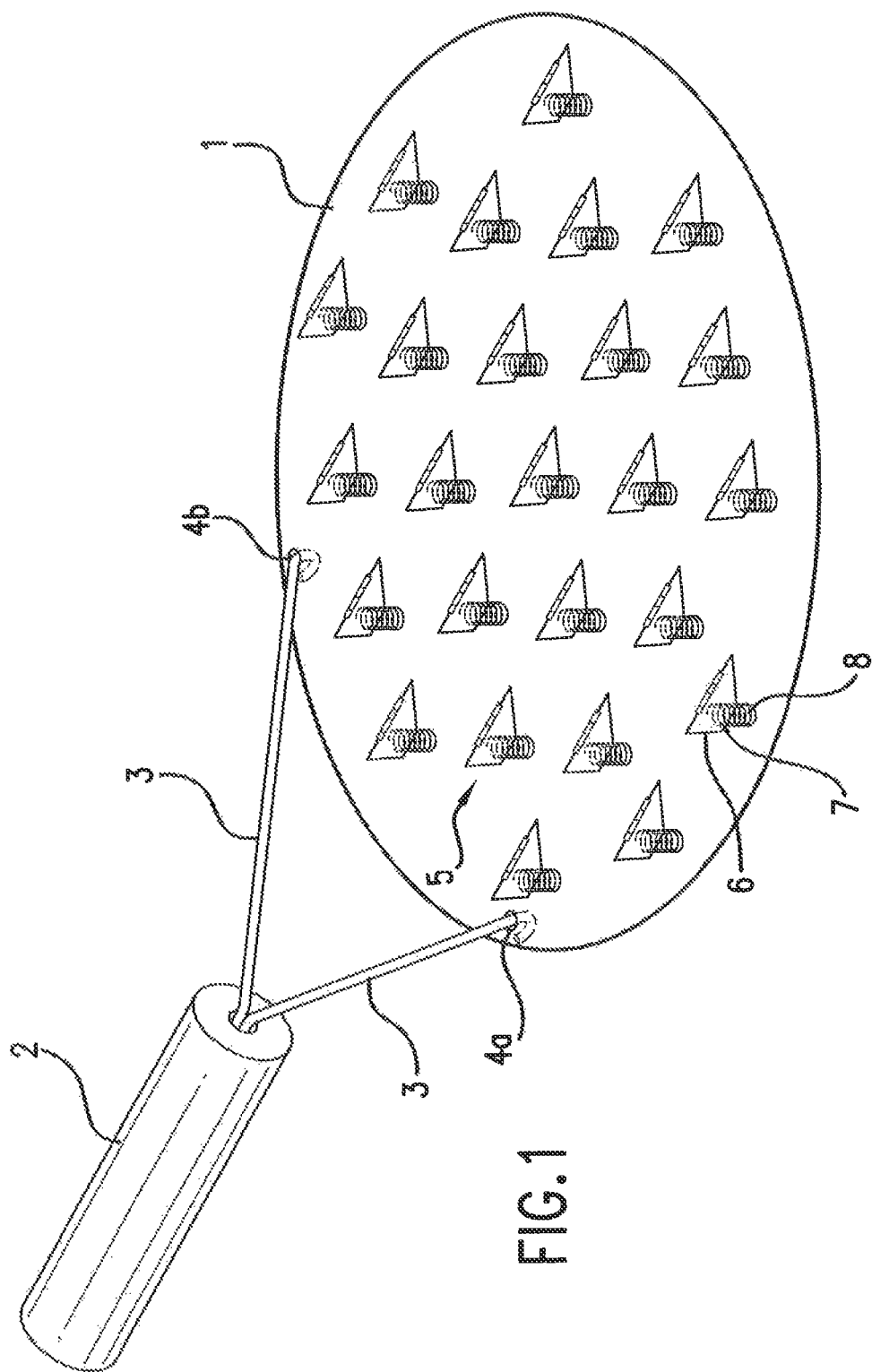
FIG. 1 is a perspective view of the Pizza Peeler.

FIG. 1 shows a perspective view of the Pizza Peeler. The pan portion (1) is attached to the handle portion (2) with connectors (3). The connectors (3) attached to handle at connection point (4a) and to the pan at connection point (4b). Either connection point (4a or 4b) may optionally be a hinge that allows the handle and/or connectors to be folded on top of the pan portion (1) to reduce to size of the Pizza Peeler for easier storage. In some embodiments the connectors (3) are reduced in size and directly connect the handle (2) to the pan portion. The reduced connectors may optionally be a hinge. Claws (5) are dispersed through out the pan portion (1). FIG. 1 shows the two bodied embodiment of the claws (5). The claw (5) has a body portion (6), a top portion (7) and a spring (8) which is a resistance mechanism.

Figure 2:
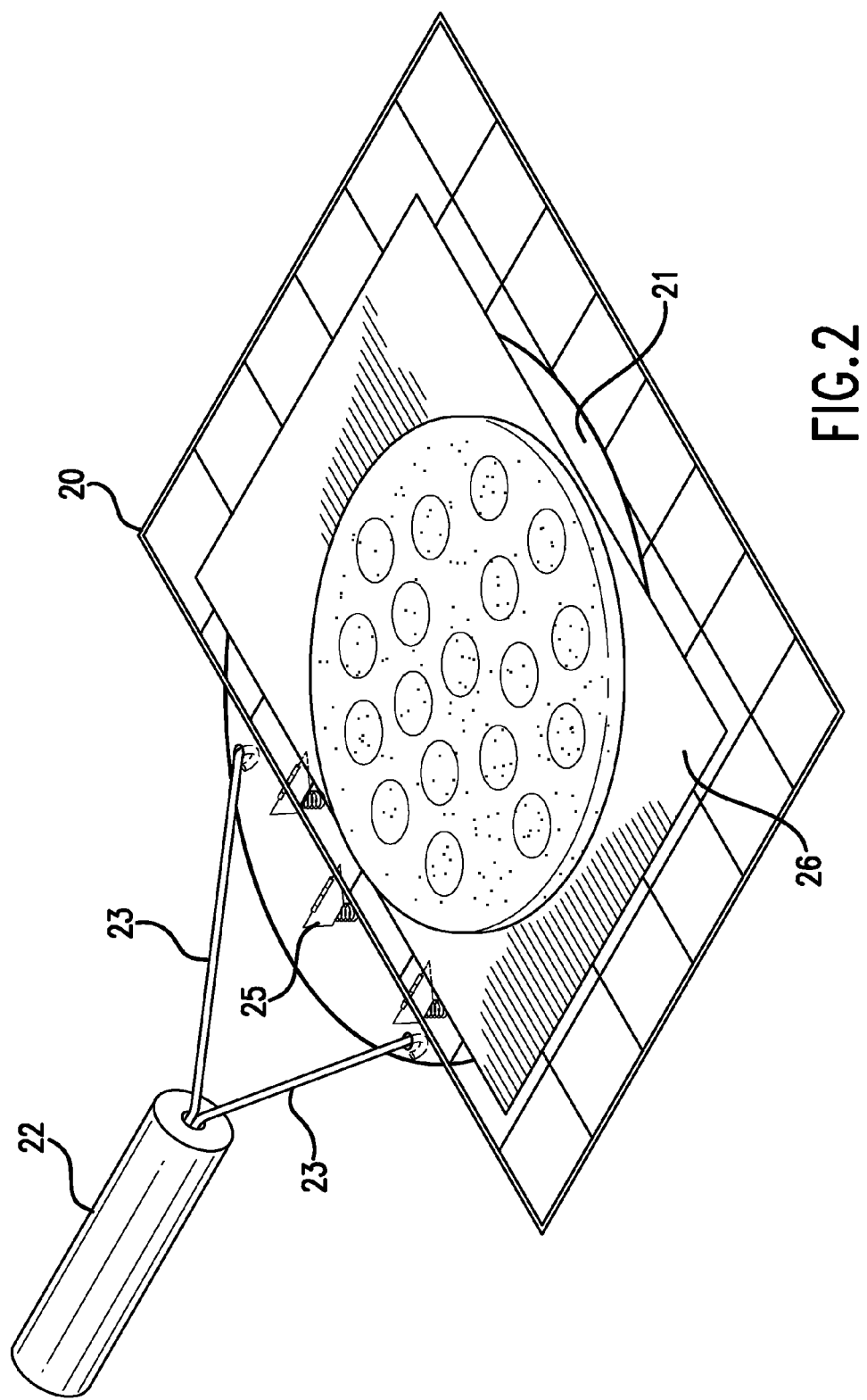
FIG. 2 is a perspective view of the Pizza Peeler positioned under an object on a grill rack.

FIG. 2 is a perspective view of the Pizza Peeler positioned under an object on a grill rack. The pan portion (21) is place directly below grill grate (20) and the object (26) on the grill grate (20). When in operation the claws (25) will extend upward through the grill grate (20) and lift the object (26) off the grill grate (20). The operator will then handle (22) which is connected to the pan portion (21) with connectors (23) away from the grill grate (20). This will cause the pan portion (21) to slide along the bottom of grill grate (20). When a claw (25) encounters a bar of the grill grate (20) it will be retracted by the physical force generated by the claw's (25) contact with the bar of the grill grate (20). When the claw's (25) contact with the bar of the grill grate (20) is ended, the claw re-extends causing it to again contact the object (26) being removed from the grill grate (20). The claws (25) are arranged on the pan portion (21) to ensure that at any particular monument enough claws (25) are in the extended position to support the object (26).

Figure 3:
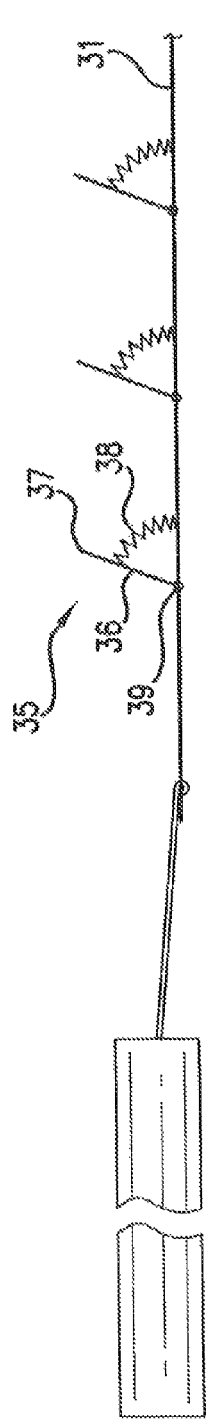
FIG. 3 is a side view of a one bodied claw.

FIG. 3 is a side view of a one bodied claw. The claw (35) extends from the surface of the pan portion (31). The claw has a top portion (37) and a body portion (36). The base of the body portion (36) is connected to the surface of the pan portion by a hinge (39). A spring (38) is attached to the body portion (36) and to the surface of the pan portion (31) at some point between the base of the body portion (36) and the top portion (37).

Figure 4:
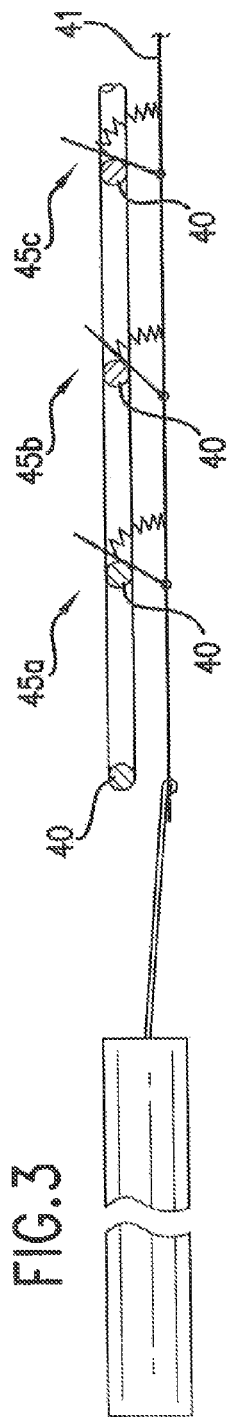
FIG. 4 is a side view of one bodied claws operating on a grill grate.

FIG. 4 is a side view of one bodied claws operating on a grill grate. The Figure shows three different claws (45a, b, and c) at various stages of interaction with the bars of the grill grate (40). The first claw (45a) has recently made contact with the bars of the grill grate (40) and is less retracted than the second claw (45b). The third claw (45c) is between contacts with the bars of the grill grate (40) and is fully re-extended and perpendicular to the pan portion 41.

Figure 5:
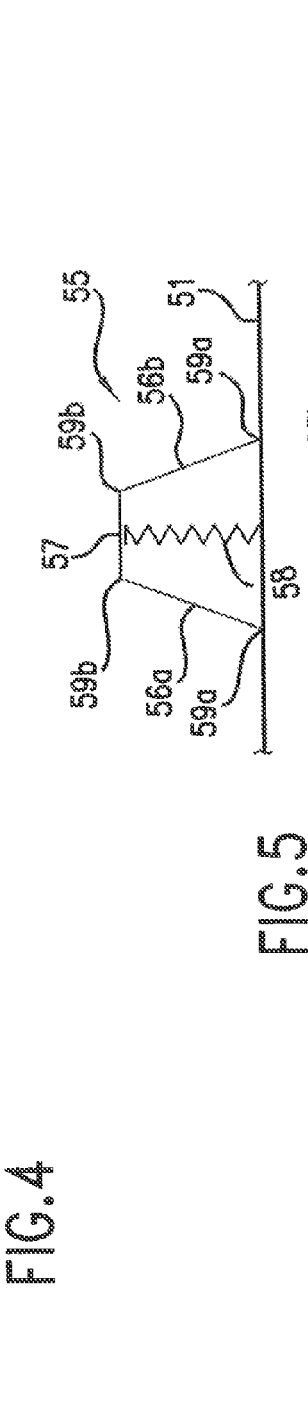
FIG. 5 is a side view of a two bodied claw.

FIG. 5 is a side view of a two bodied claw. The claw (55) has 2 body portions (56) and one top portion (57). The top portion is connected to the body portions by the upper hinged connectors (59b) and the body portions (56a and 56b) are connected to the surface of the pan portion (51) by the lower hinged connectors (59a). A spring (58) is connected to the bottom of the top portion (57) and the surface of the pan portion (51).

Figure 6:
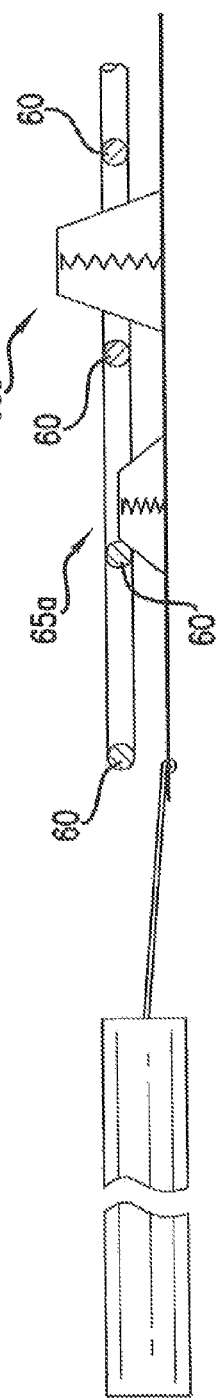
FIG. 6 is a side view of two bodied claws operating on a grill grate.

FIG. 6 is a side view of two bodied claws operating on a grill grate. The Figure shows two different claws (65a and b) where 65a is retracted and 65b is extended. The fifth claw (65a) has made contact with the bars of the grill grate (60) which has caused it to retract. Than the second claw (65b) is between contacts with the bars of the grill grate (60) and is fully re-extended.

For the purposes of this invention a claw (5) is defined as any retractable protrusion from the surface of the pan portion with the capacity to support an object. FIG. 1 shows only the two bodied embodiment of the claw but claw (5) will be used to refer to any form of claw. Similarly the pan portion (1), handle (2), connectors (3), connection points (4a and 4b), body portion (6), top portion (7), and spring (8) will also be referenced as universals of their respective parts.

In some embodiments, each claw (5) re-extends after the physical force to a side of the body portion (6) is removed. FIGS. 4 and 6 show one (45a, 45b, and 45c) and two (65a and 65b) bodied claws respectively, in various degrees of retraction and re-extension.

The pan portion (1) can be made of any material traditionally used for cooking that will withstand temperatures of at least 300° F. In the preferred embodiments the pan portion (1) is made of metal or wood. The pan portion (1) is generally flat. In the preferred embodiment the pan portion (1) is generally round. In some embodiments the pan portion (1) may be other shapes, for example, ovular, square, or rectangle. In some embodiments the pan portion (1) is made of or is coated with non-stick material meaning that it resists sticking to objects in which it comes into contact.

The handle portion (2) is preferably heat resistant. In some embodiments the handle portion (2) is composed of the same material as the pan portion (1). The handle portion (2) may include a coating that is heat resistant and/or makes the handle portion (2) easier to grip, for example, rubber or leather. The handle portion (2) may be directly and permanently connected to the pan portion (1) or connected via a separate connector (3), for example, metal rods or stiff wire. The handle portion (2) may also be removable.

For the purposes of this application, the term "connector" (3) may refer to the separate connector (3) or the portion of the handle portion (2) that connects directly to the pan portion which may be optionally reinforced. In some embodiments the connector is hinged at connection points (4a and 4b) and allows the pan portion (1) to fold onto the handle portion (2). In the embodiments with a hinged connector (3) the hinge may optionally be locked in the unfolded or folded position, for example, locked in the unfolded position when in use. For the purposes of this invention a hinge is any connecting device that allows for the movement of the two elements being connected in at least one directional plane.

Each claw (5) has at least one body portion (6), and a top portion (7). The body portion(s) (6) of the claw (5) are connected to the pan portion (1) by a hinge (39 and 59a). In some embodiments the claw's body (6) and top portions (7) are connected by hinges (59b). In some embodiments the body (6) and top portions (7) are continuous with each other. In the preferred embodiment only the top portion (7) of the claw comes into contact with the object being removed.

In some embodiments of the invention, the claw (5) has at least a one body portion (6) that extends from the surface of the pan portion (1) at a diagonal or is perpendicular to the surface of the pan portion (1).

In some embodiments of the invention, the claw (55) has two body portions (56) in the same plane wherein the one body portion (56a) extends from the surface of the pan portion at a diagonal away from the pan portion (51) and away from the handle portion (2) and the second body portion (56b) extends from the surface of the pan portion (51) at a diagonal away from the pan portion (51) and toward the handle portion (2) and wherein both body portions (56a and 56b) connect to a top portion (57).

In some embodiments of the device the claws (35) have only one body portion (36) and are hinged (39) at the connection between the body of the claw (36) and the pan portion (31). In some of the one body embodiments (35) the claws have a straight body (36) that when fully un-retracted extends perpendicular to the pan portion (31). In some of the one body embodiments (35) the body (36) extends at a diagonal from the pan portion (31) away from the handle (2) and a top portion (37) that extending upward from the body (36) of the claw at a perpendicular to the pan portion (31) or optionally extends at the same parallel as the body (36). In some of the one body (35) embodiments, the hinge (39) comprises multiple hinges, for example, one hinge on each side of the base of the body. In the one body embodiments the resistance to retraction is optionally provided by the hinge (39). In these embodiments the hinge (39) is optionally spring loaded. In the one body embodiments the claw (35) rotates from being perpendicular or at a diagonal to the pan portion (31) surface when un-retracted to being parallel with the pan portion (31) surface when retracted. In these embodiments the claws (35) rotate away from the handle portion (2).

In some embodiments, the claws (55) have two body portions (56a and 56b) and are hinged at the connection (59a) between the body portions (56a and 56b) of the claw and the pan portion (51) and at the connection (59b) between the body portions (56a and 56b) of the claw and top portion (57) of the claw. In the two body embodiments (55), the body portions (56a and 56b) extend at a diagonal from the pan portion (51) toward each other meeting at the top portion (57) where each body portion (56a and 56b) is connected to the top portion (57) by way of a hinge (59b). In the two body embodiments (55), the body portions (56a and 56b) optionally slide away from each other when being retracted, for example, when coming into contact with an oven or grill grate (20). In some embodiments the bodies slide on tracts in the pan portion (51). In some embodiments, the top portion (57) folds under the two body portions (56a and 56b) when being retracted. In some embodiments, the pan portion (51) has indentions allowing the two body portions (56a and 56b) with the top portion (57) fold beneath to be housed within the pan portion (51) when fully retracted wherein the top of the two body portions (56a and 56b) is continuous with the surface of the pan portion (51). In the two body embodiments (55), the hinges (59a and 59b) optionally provide resistance to retraction like in the one body embodiments (35). In other embodiments a spring (58) is positioned under the top portion (57) and between the two body portions (56a and 56b) and provides resistance to retraction. In some embodiments, the pan portion (51) has indentions that house the spring (58). In some embodiments, both the hinge (59a and 59b) and a spring (58) jointly provide resistance to retraction.

In some embodiments, of the device the top portion (7) is more slip resistant than the body portion (6). The top portion (7) is optionally made of rubber or a rubber composite material. In these embodiments the top portion (7) is therefore better able to grip the object it touches and is retrieving. When the body portion (6) comes into contact with a cross beam of an oven or grill grate (20), the forward motion provided by a person pulling the device from the oven or grill (2) pushes on the body portion (6) of the claw (5) causing it to retract. The cross beam of the oven or grill grate (20) will slide up the body portion (6) of the claw (5) retracting the claw as necessary. When retracted the top portion (7) of the claw (5) does not contact the object being retrieved. When the claw (5) is past the cross beam it will un-retract and the top portion (7) of the claw (5) will again contact the object being retrieved.

The claws (5) are optionally evenly distributed throughout the pan. In other embodiments they may be arranged in rows, columns, or various patterns.

In some embodiments, all claws (5) are on only one side of the pan.

In some embodiments, each claw (5) contains at least one spring (8) that provides the resistance to retraction. In some embodiments, when the claws (5) are fully retracted they are flush with the surface of the pan portion (1) and do not protrude at all from the surface of the pan portion (1).

In some embodiments, the pan portion (1) has indentions in its surface to allow the claws to retract into it.

In some embodiments, when the claws (5) are retracted the body portion(s) (6) of the claws align with the surface of the pan portion (1) to form a continuous surface.

In some embodiments, of the device the handle portion (2) is coated in a heat resistant and/or grip enhancing material.

In some embodiments, the surface of the pan portion (1) not occupied by claws (5) is flat.

In some embodiments, the pan portion (1) is made of metal or wood.

In some embodiments, the top portion (7) of the claw (5) is flat or triangular.

In some embodiments, the connector (3) is a hinge.

In some embodiments, the connector (3) is a metal.

In some embodiments, the handle (2) is wood, metal, or a synthetic material.

In some embodiments, the claws (5) support up to 20 pound object, but only up to 5 pounds of force applied to the side of the body portion (6) of a claw (5). Force applied to the side of the body (6) is defined as the force applied to the front or back of the body portion of the claw, for example, by a crossbeam of an oven or grill (20).

In some embodiments of the invention, the device is used by placing it below the object to be retrieved and against the bottom side of the rack or grill (20) the object is resting on. Claws (5) protruding from the device extend upward through the gaps in the oven rack or grill (20) and lift the object to be retrieved off of the over rack or grill (20) surface. As the device is pulled from the oven or grill the claws (5) alternate between being partially or fully retracted while under a cross beam and un-retracted while in the space between cross beams. The object is thus continually supported by the un-retracted claws (5) and the device is allowed to be removed from the oven or grill (20).

What is claimed is:

1. A device for retrieving objects from a surface with openings comprising:
   A. a pan portion having a surface;
   B. a handle portion connected to an edge of said pan portion;
   C. at least two retractable claws extending from the surface of the pan portion comprising:
      i. at least one body portion and
      ii. a top portion wherein each claw independently extends above said pan portion surface to support an object on the top portion and retracts when physical force is applied to a side of said body portion and
   wherein each claw re-extends after the physical force to a side of the of the body portion is removed.

2. A device of claim 1 wherein the handle portion is coated in a heat resistant material.

3. A device of claim 2 wherein a spring re-extends the claw after the physical force to a side of the of the body portion is removed.

4. A device of claim 2 wherein the claws have at least one hinge that re-extends the claw after the physical force to a side of the of the body portion is removed.

5. A device of claim 2 wherein the claws have one body portion.

6. A device of claim 2 wherein the claws have two body portions.

7. A device of claim 1 wherein the pan portion is made of metal, a synthetic material, or wood.

8. A device of claim 1 wherein said body portion extends from the surface of the pan portion surface at a diagonal or a perpendicular.

9. A device of claim 1 wherein said retractable claws comprise two body portions that are in the same plane wherein one body portion extends from the surface of the pan portion at a diagonal away from the pan portion surface and away from the handle portion and the second body portion extends from the pan portion surface at a diagonal away from the pan portion and toward the handle portion and wherein both body portions connect to said top portion.

10. A device of claim 1 wherein a connector connects the handle portion to the pan portion.

11. A device of claim 10 wherein the connector between the handle portion and the pan portion is a hinge.

12. A device of claim 1 wherein the surface of the pan portion riot occupied by claws is flat.

13. A device of claim 12 wherein when the claws are retracted, the top of the body portion of the claws align with the surface of the pan portion to form a continuous surface.

14. A device of claim 1 wherein the claws support up to 20 pound object, but only up to 5 pounds of force applied to the side of the body portion of a claw.

15. A method for removing an object positioned on an oven or grill comprising:
   A. placing the device of claim 1 below a rack on which the object to be retrieved is positioned such that the claws extend upward through the gaps in the oven rack or grill,
   B. lifting the object to be retrieved off of the over rack or grill surface with the device of claim 1 with the extended claws, and
   C. pulling the device of claim 1 from the oven or grill wherein the claws retract when under a cross beam of the grill or oven rack and extend when in the space between cross beams of the grill or oven rack and wherein the object is continually supported by the extended claws while the device of claim 1 is pulled.

16. A device of claim 1 wherein the pan portion has a non-stick surface.

17. A device of claim 1 wherein a pizza is the object being acted upon.

* * * * *